(12) United States Patent
Oh

(10) Patent No.: US 10,679,585 B2
(45) Date of Patent: Jun. 9, 2020

(54) APPARATUS AND METHOD FOR CONVERTING CONTENT AND OUTPUTTING THE CONVERTED CONTENT

(71) Applicant: SAMSUNG ELECTRONICS CO., LTD., Suwon-si (KR)

(72) Inventor: Sung-bo Oh, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 31 days.

(21) Appl. No.: 15/091,011

(22) Filed: Apr. 5, 2016

(65) Prior Publication Data

US 2016/0343348 A1    Nov. 24, 2016

(30) Foreign Application Priority Data

May 21, 2015 (KR) .................. 10-2015-0070981

(51) Int. Cl.
  *G09G 5/10* (2006.01)
  *G06F 3/14* (2006.01)
  (Continued)

(52) U.S. Cl.
  CPC .................. *G09G 5/10* (2013.01); *G06F 3/14* (2013.01); *G06T 5/00* (2013.01); *G06T 5/009* (2013.01); *G09G 5/006* (2013.01); *H04N 19/46* (2014.11); *G06T 2207/20208* (2013.01); *G09G 2320/0271* (2013.01); *G09G 2320/0276* (2013.01); *G09G 2320/0673* (2013.01); *G09G 2340/00* (2013.01);
  (Continued)

(58) Field of Classification Search
  None
  See application file for complete search history.

(56) References Cited

U.S. PATENT DOCUMENTS 6,771,278 B2* 8/2004 Shigeta .................... G06F 3/14
                                                    345/625
10,205,996 B2* 2/2019 Oh ........................ G09G 5/006
(Continued)

FOREIGN PATENT DOCUMENTS

CN     102741883 A     10/2012
CN     103843058 A     6/2014
(Continued)

OTHER PUBLICATIONS

Communication issued by the European Patent Office dated Jul. 31, 2017 in counterpart European Patent Application No. 16162720.3.
(Continued)

*Primary Examiner* — Hilina K Demeter
(74) *Attorney, Agent, or Firm* — Sughrue Mion, PLLC

(57) ABSTRACT

An apparatus for outputting a content to a display, including a communicator configured to perform a data communication with the display; an input interface configured to receive an input content and metadata associated with the input content; and a processor configured to acquire image quality information applied to the content based on the metadata, to convert the input content into a converted content outputtable on the display by using content conversion information related to the acquired image quality information, and to control the communicator to output the converted content to the display.

17 Claims, 11 Drawing Sheets

(51) Int. Cl.
*G09G 5/00* (2006.01)
*G06T 5/00* (2006.01)
*H04N 19/46* (2014.01)

(52) U.S. Cl.
CPC . *G09G 2340/0428* (2013.01); *G09G 2370/04* (2013.01); *G09G 2370/042* (2013.01)

(56) References Cited

U.S. PATENT DOCUMENTS

| | | | | |
|---|---|---|---|---|
| 2009/0033668 | A1* | 2/2009 | Pederson | G06F 3/14 345/520 |
| 2011/0316973 | A1* | 12/2011 | Miller | G09G 3/003 348/43 |
| 2012/0314129 | A1* | 12/2012 | Mertens | H04N 19/17 348/474 |
| 2014/0002694 | A1 | 1/2014 | Levy et al. | |
| 2014/0028798 | A1* | 1/2014 | Tsukagoshi | H04N 19/597 348/43 |
| 2014/0210847 | A1* | 7/2014 | Knibbeler | G11B 20/10 345/589 |
| 2014/0225941 | A1 | 8/2014 | Van der Vleuten et al. | |
| 2015/0208024 | A1* | 7/2015 | Takahashi | H04N 21/431 386/353 |
| 2015/0245004 | A1* | 8/2015 | Guo | H04N 5/46 348/453 |
| 2015/0245043 | A1* | 8/2015 | Greenebaum | H04N 5/2355 375/240.25 |
| 2015/0245050 | A1* | 8/2015 | Tourapis | G09G 5/005 375/240.02 |
| 2015/0326846 | A1* | 11/2015 | Stec | H04N 21/816 348/43 |
| 2016/0134832 | A1* | 5/2016 | Yamamoto | H04N 19/70 386/248 |
| 2016/0142714 | A1* | 5/2016 | Toma | H04N 7/08 375/240.25 |
| 2016/0163356 | A1* | 6/2016 | De Haan | H04N 21/2358 386/241 |
| 2016/0345040 | A1* | 11/2016 | Oh | H04N 21/2343 |
| 2017/0078706 | A1* | 3/2017 | Van Der Vleuten | G09G 5/10 |

FOREIGN PATENT DOCUMENTS

| | | |
|---|---|---|
| WO | 2011097060 A2 | 8/2011 |
| WO | 2013046095 A1 | 4/2013 |
| WO | 2014077827 A1 | 5/2014 |

OTHER PUBLICATIONS

Communication dated Jun. 15, 2016, issued by the European Patent Office in counterpart European Application No. 16162720.3.
Communication dated Jul. 11, 2016, issued by the European Patent Office in counterpart European Application No. 16162720.3.
Communication dated Jun. 6, 2018, issued by the European Patent Office in counterpart European Application No. 16162720.3.
Communication dated Oct. 9, 2018, issued by the State Intellectual Property Office of P.R. China in counterpart Chinese Application No. 201610341332.5.
Communication dated Feb. 26, 2019, from the European Patent Office in counterpart European Application No. 16162720.3.
Communication dated Jun. 5, 2019 issued by the State Intellectual Property Office of P.R. China in counterpart Chinese Application No. 201610341332.5.

* cited by examiner

FIG. 5

| SDR | HDR |
|---|---|
| R0 | R'0 |
| R1 | R'1 |
| R2 | R'2 |
| R3 | R'3 |
| ⋮ | ⋮ |
| R255 | R'255 |

| SDR | HDR |
|---|---|
| R0 | R'0 |
| R5 | R'5 |
| R10 | R'10 |
| R15 | R'15 |
| ⋮ | ⋮ |
| R255 | R'255 |

| Value | Transfer Characteristic | | Informative Remark |
|---|---|---|---|
| 0 | Reserved | | For future use by ITU-T \| ISO/IEC |
| 1 | $V=1.099*L_c^{0.45}-0.099$ <br> $V=4.400*L_c$ | for $1>=L_c>=0.018$ <br> for $0.018>L_c>=0$ | Rec. ITU-R BT.709-5 <br> Rec. ITU-R BT.1361 conventional colour gamrut system <br> (functionally the same as the value 6) |
| 2 | Unspecified | | Image characteristics are unknown or are determined by the application. |
| 3 | Reserved | | For future use by ITU-T \| ISO/IEC |
| 4 | Assumed display gamma 2.2 | | Rec. ITU-R BT.470-6 System M (historical) <br> United States National Television System Committee 1953 Recommendation for transmission standards for colour television <br> United States Federal Communications Commission Title 47 Code of Federal Regulations (2003) 73.682 (a) (20) <br> Rec. ITU-R BT.1700 (2007 revision) 625 PAL and 625 SECAM |
| 5 | Assumed display gamma 2.8 | | Rec. ITU-R BT.470-6 System B.G (historical) |
| 6 | $V=1.099*L_c^{0.45}-0.099$ <br> $V=4.500*L_c$ | for $1>=L_c>=0.018$ <br> for $0.018>L_c>=0$ | Rec. ITU-R BT.601-6 525 or 625 <br> Rec. ITU-R BT.1358 525 or 625 <br> Rec. ITU-R BT.1700 NTSC |

SDR→HDR CONVERSION METHOD

APPARATUS AND METHOD FOR CONVERTING CONTENT AND OUTPUTTING THE CONVERTED CONTENT

CROSS-REFERENCE TO RELATED APPLICATIONS

This application claims benefit from Korean Patent Application No. 10-2015-0070981, filed on May 21, 2015, in the Korean Intellectual Property Office, the disclosure of which is incorporated herein by reference in its entirety.

BACKGROUND

Field

Apparatuses and methods consistent with exemplary embodiments relate to an apparatus and a method for outputting a content, and a display apparatus, and more particularly, to an apparatus and a method for outputting a content to provide a high-definition content, and a display apparatus.

Description of Related Art

Many display apparatuses are capable of playing High Dynamic Range (HDR) content. However, content played on these display apparatuses is mainly produced as a Standard Dynamic Range (SDR) content. Therefore, a technology that converts an SDR content into a content having an HDR content characteristic has been studied. As a representative example of this technology, there is a technology that converts an SDR content in order to enable the SDR content to have an HDR content characteristic in a display apparatus capable of playing an HDR content.

If an SDR content is input from a content outputting apparatus such as a Digital Video Recorder (DVR) or a Blu-ray Disc (BD) player, a display apparatus capable of playing an HDR content gamma-corrects the input SDR content by using gamma information applicable to an HDR content to convert the SDR content into a content having a characteristic of the HDR content.

However, if the display apparatus converts the input SDR content into the content having the characteristic of the HDR content through an existing technology as described above, the gamma information applied to the SDR content is not known. Therefore, the SDR content is not accurately converted into the content having the characteristic of the HDR content.

In other words, the display apparatus receives only a decoded SDR content and additional information about the SDR content from the content outputting apparatus through an interface such as a High Definition Multimedia Interface (HDMI). Therefore, the display apparatus may not check the gamma information applied to the SDR content.

As a result, the display apparatus converts the SDR content into the content having the characteristic of the HDR content by using gamma information applicable to the display apparatus without considering the gamma information applied to the SDR content. Therefore, the display apparatus displays a content, which is not correctly converted from the received SDR content in order to have the characteristic of the HDR content, on a screen.

SUMMARY

Exemplary embodiments may overcome the above disadvantages and other disadvantages not described above. Also, exemplary embodiments are not required to overcome the disadvantages described above, and an exemplary embodiment may not overcome any of the problems described above.

Exemplary embodiments provide converting a Standard Dynamic Range (SDR) content into a content corresponding to a High Dynamic Range (HDR) content outputtable on a display apparatus.

According to an aspect of an exemplary embodiment, an apparatus for outputting a content to a display includes a communicator configured to perform a data communication with the display; an input interface configured to receive an input content and metadata associated with the input content; and a processor configured to acquire image quality information applied to the content based on the metadata, to convert the input content into a converted content outputtable on the display by using content conversion information related to the acquired image quality information, and to control the communicator to output the converted content to the display.

The input content may include a Standard Dynamic Range (SDR) content, the image quality information applied to the input content may include gamma information, and the converted content outputtable on the display may include a High Dynamic Range (HDR) content.

The content conversion information may include a lookup table for converting SDR pixel values of image frames of the SDR content into HDR pixel values having a characteristic of the HDR content, wherein the display may be further configured to gamma-correct the converted content by using gamma information predetermined to be applied to the HDR content.

The HDR pixel values may correspond to the SDR pixel values of the image frames of the SDR content, and the processor may be further configured to convert the SDR pixel values of the image frames of the SDR content into the HDR pixel values based on the lookup table.

The HDR pixel values may correspond to a subset of the SDR pixel values of the image frames of the SDR content, and the processor may be further configured to determine other HDR pixel values corresponding to other SDR pixel values from the HDR pixel values corresponding to the subset of the SDR pixel values based on the lookup table.

The apparatus may further include a storage configured to store a plurality of pieces of content conversion information corresponding to a plurality of pieces of gamma information applicable to the SDR content, and the processor may be further configured to acquire the content conversion information corresponding to the gamma information from the storage.

The processor may be further configured to determine whether at least one from among Video Usability Information (VUI) or Supplemental Enhancement Information (SEI) of the metadata includes the gamma information applied to the SDR content.

In response to the at least one from among VUI or SEI of the metadata not including the gamma information applied to the SDR content, the processor may be further configured to determine the gamma information applied to the SDR content based on resolution information of the SDR content based on the at least one from among VUI or SEI of the metadata.

The processor may be further configured to control the communicator to transmit to the display content information comprising information for gamma-correcting the converted content in the display.

In response to Extended Display Identification Data (EDID) being received from the display through the communicator, the processor may be further configured to determine whether the display is capable of playing the HDR content based on the received EDID and to convert the SDR content into the HDR content in response to determining that the display is capable of playing the HDR content.

The apparatus may further include: a storage configured to store a plurality of pieces of content conversion information corresponding to a plurality of pieces of gamma information applicable to the SDR content, and the processor may be further configured to acquire the content conversion information based on the acquired gamma information and display gamma information included in the EDID received from the display.

According to another aspect of an exemplary embodiment, a method of outputting a content from a content outputting apparatus to a display includes receiving an input content and metadata associated with the input content; acquiring image quality information applied to the input content based on the metadata; determining content conversion information related to the acquired image quality information; converting the input content into a converted content outputtable on the display using the content conversion information; and outputting the converted content to the display.

The input content may include an SDR content, the image quality information applied to the input content may include gamma information, and the converted content outputtable on the display may include an HDR content.

The content conversion information may include a lookup table for converting SDR pixel values of image frames of the SDR content into HDR pixel values having a characteristic of the HDR content, and the display may gamma-correct the converted content by using gamma information predetermined to be applied to the HDR content.

The HDR pixel values may correspond to the SDR pixel values of the image frames of the SDR content, and the converting may further include converting the SDR pixel values of the image frames of the SDR content into the HDR pixel values based on the lookup table.

The HDR pixel values correspond to a subset of the SDR pixel values of the image frames of the SDR content, and the converting may further include determining other HDR pixel values corresponding to other SDR pixel values from the HDR pixel values corresponding to the subset of the SDR pixel values based on the lookup table.

The acquiring may further include acquiring the content conversion information corresponding to the gamma information from a plurality of pieces of content conversion information corresponding to a plurality of pieces of gamma information applicable to a pre-stored SDR content.

The acquiring may further include determining whether at least one from among Video Usability Information (VUI) or Supplemental Enhancement Information (SEI) of the metadata may include the gamma information applied to the SDR content.

The acquiring may further include, in response to at least one from among the VUI or SEI of the metadata not including the gamma information, determining the gamma information based on resolution information of the SDR content included in the VUI or SEI.

The outputting may further include transmitting content information including information for gamma-correcting the converted content in the display to the display.

The method may further include: in response to Extended Display Identification Data (EDID) being received from the display, determining whether the display is capable of playing the HDR content, based on the received EDID, and in response to a determination that the display is capable of playing the HDR content, the SDR content may be converted into the HDR content.

According to a further aspect of an exemplary embodiment, a display apparatus includes a communicator configured to perform a data communication with a content outputting apparatus; a display configured to display a content; and a processor configured to, in response to the content being received from the content outputting apparatus through the communicator, correct an image quality of the content using image quality information predetermined to be applied to the content and control the display to display the content having the corrected image quality, wherein the content is a content corresponding to an HDR content.

According to a still further aspect of an exemplary embodiment, a content providing apparatus includes a communicator configured to communicate with a display; an input interface configured to receive a Standard Dynamic Range (SDR) content; and a processor configured to determine gamma information associated with the input content, to determine content conversion information related to the gamma information, to convert the SDR content into High Dynamic Range (HDR) content using the content conversion information, and to output the HDR content to the display.

Additional and/or other aspects and advantages of will be set forth in part in the description which follows and, in part, will be obvious from the description, or may be learned by practice of the exemplary embodiments.

BRIEF DESCRIPTION OF THE DRAWING FIGURES

The above and/or other aspects of exemplary embodiments will be more apparent by describing certain exemplary embodiments with reference to the accompanying drawings, in which:

FIG. 5 illustrates content conversion information for converting a Standard Dynamic Range (SDR) content into a content having a characteristic of a High Dynamic Range (HDR) content, according to an exemplary embodiment;

FIG. 6 illustrates content conversion information for converting an SDR content into a content having a characteristic of an HDR content, according to another exemplary embodiment;

FIG. 7 illustrates Video Usability Information (VUI) or Supplemental Enhancement Information (SEI) of metadata of an SDR content, according to an exemplary embodiment;

DETAILED DESCRIPTION OF THE EXEMPLARY EMBODIMENTS

Figure 1:
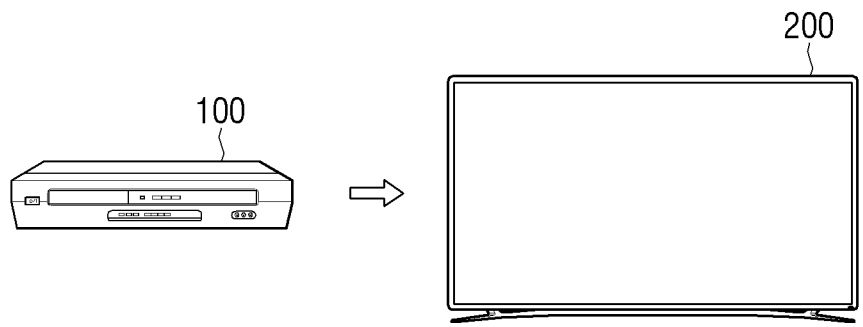
FIG. 1 illustrates a configuration of a content player system according to an exemplary embodiment.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in an understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 illustrates a configuration of a content player system according to an exemplary embodiment.

As shown in FIG. 1, the content player system includes a content outputting apparatus 100 and a display apparatus 200.

The content outputting apparatus 100 is an apparatus that reads a content stored on a recording medium, such as a Digital Video Disc (DVD) or a Blue-ray disc (BD), and outputs the read content to the display apparatus 200. In particular, if the content stored on the recording medium, such as the DVD or the BD disc, is a Standard Dynamic Range (SDR) content, the content outputting apparatus 100 converts the SDR content into a content corresponding to a High Dynamic Range (HDR) content and outputs the converted content to the display apparatus 200.

The display apparatus 200 may be a display apparatus such as a smart TV and may display the content output from the content outputting apparatus 100 on a screen. The display apparatus 200 may be an apparatus capable of playing an HDR content. Therefore, if the content corresponding to the HDR content is received from the content outputting apparatus 100, the display apparatus 200 may gamma-correct the content corresponding to the HDR content received from the content outputting apparatus 100 by using gamma information preset to be applied to the HDR content, and display the gamma-corrected content on the screen.

According to an exemplary embodiment, if an SDR content stored on a recording medium, such as a DVD or a BD, is input, the content outputting apparatus 100 acquires gamma information applied to the SDR content with reference to metadata of the input SDR content. The content outputting apparatus 100 converts the SDR content into a content corresponding to an HDR content outputtable on the display apparatus 200 based on content conversion information related to the acquired gamma information among pre-stored content conversion information. The content outputting apparatus 100 transmits the content, which is converted to be outputtable on the display apparatus 200, to the display apparatus 200.

Therefore, the display apparatus 200 may gamma-correct the content received from the content outputting apparatus 100 based on the gamma information preset to be applied to the HDR content and display the gamma-corrected content.

According to another exemplary embodiment, if an SDR content stored on a recording medium, such as a DVD or a BD, is input, the content outputting apparatus 100 acquires gamma information applied to the SDR content with reference to metadata of the input SDR content. The content outputting apparatus 100 converts the SDR content into a content corresponding to an HDR content outputtable on the display apparatus 200 based on content conversion information related to the acquired gamma information among pre-stored content conversion information. The content outputting apparatus 100 transmits a content, which is converted to be outputtable on the display apparatus 200, and content conversion information applied to the corresponding content to the display apparatus 200.

Therefore, the display apparatus 200 may gamma-correct a content received from the content outputting apparatus 100 by using gamma information related to content conversion information received from the content outputting apparatus 100 and display the gamma-corrected content.

According to another exemplary embodiment, if an SDR content recorded on a recording medium such as a DVD or a BD is input, the content outputting apparatus 100 acquires gamma information applied to the SDR content with reference to metadata of the input SDR content. The content outputting apparatus 100 may receive Extended Display Identification Data (EDID) information from the display apparatus 200. Here, the EDID information may include gamma information preset to be applied to an HDR content in the display apparatus 200. If the EDID information is received, the content outputting apparatus 100 converts the SDR content into a content corresponding to an HDR content outputtable on the display apparatus 200, based on acquired gamma information of pre-stored content conversion information and gamma information of the received EDID information. The content outputting apparatus 100 transmits the content, which is converted to be outputtable on the display apparatus 200, to the display apparatus 200.

Therefore, the display apparatus 200 may gamma-correct a content received from the content outputting apparatus 100 by using gamma information related to content conversion information received from the content outputting apparatus 100 and display the gamma-corrected content.

Elements of the content player system according to exemplary embodiments have been respectively briefly described. Some exemplary embodiments of the content outputting apparatus 100 will now be described in detail.

Figure 2:
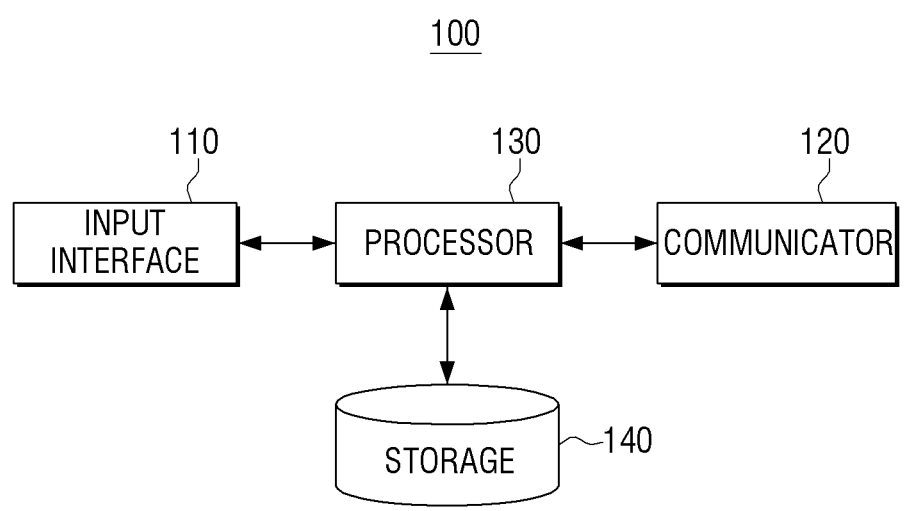
FIG. 2 is a block diagram of an apparatus for outputting a content, according to an exemplary embodiment.
Figure 3:
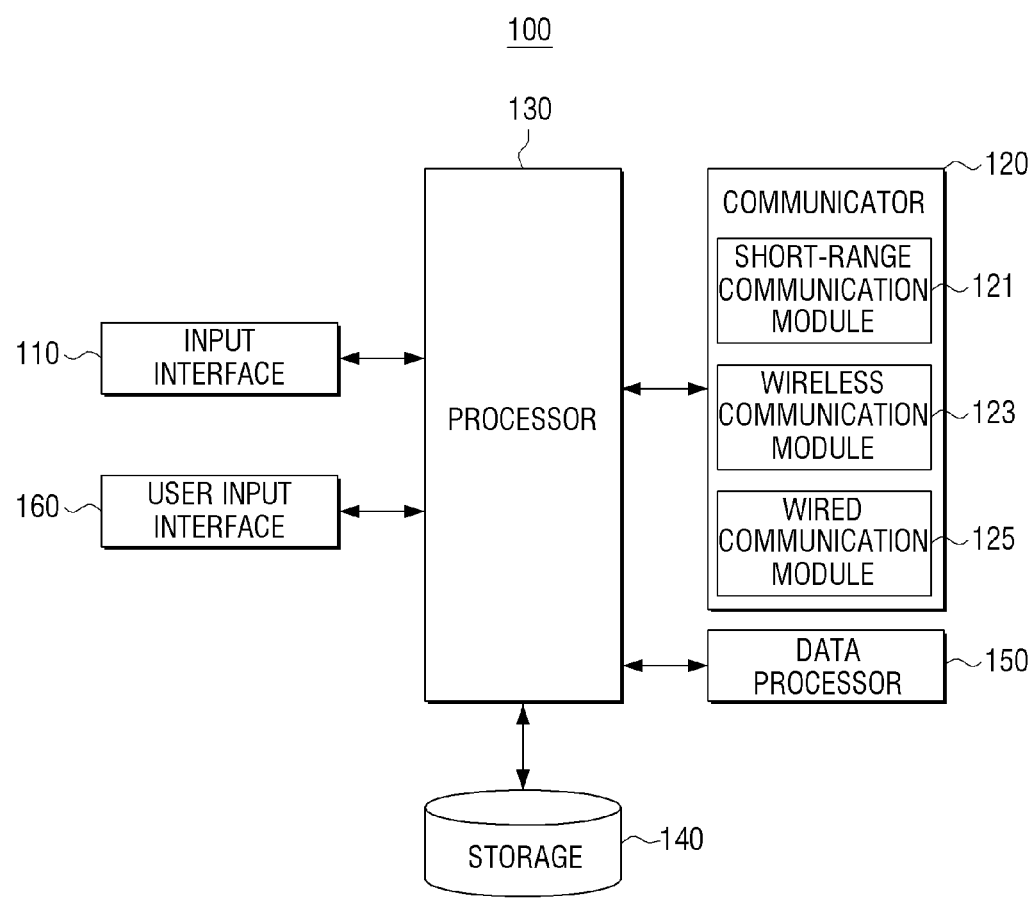
FIG. 3 is a detailed block diagram of an apparatus for outputting a content, according to an exemplary embodiment.

FIG. 2 is a block diagram of a content outputting apparatus 100, according to an exemplary embodiment. FIG. 3 is a detailed block diagram of the content outputting apparatus 100, according to an exemplary embodiment.

As shown in FIG. 2, the content outputting apparatus 100 includes an input interface 110, a communicator 120, a processor 130, and a storage 140.

The input interface 110 receives a content recorded on a recording medium such as a DVD or a BD and metadata of the corresponding content. Here, the content is an SDR content, and the metadata may include Video Usability Information (VUI) or Supplemental Enhancement Information (SEI) including at least one selected from encoding information of the SDR content, gamma information applied to the SDR content, resolution information, and up-scale ratio information.

The communicator 120 performs a data communication with the display apparatus 200 that plays a content. Here, the display apparatus 200 may be a display apparatus capable of playing an HDR content. Therefore, the communicator 120 may perform the data communication with the display apparatus 200 and transmit a content, which is converted to correspond to the HDR content in relation to the SDR content, to the display apparatus 200.

The communicator 120 may perform communication by wire or wirelessly to perform the data communication with the display apparatus 200. In this case, the communicator 120 may include a short-range communication module 121, a wireless communication module 123, and a wired communication module 125.

The short-range communication module 121 may wirelessly perform a short-range communication with the display apparatus 200 and include at least one selected from a Bluetooth module, an Infrared Data Association (IrDA) module, a Near Field Communication (NFC) module, a WiFi module, and a Zigbee module.

The wireless communication module 123 is a module that is connected to an external network to perform communications according to a wireless communication protocol such as Institute of Electrical and Electronics Engineers (IEEE) or the like. In other words, the wireless communication module 123 may be a mobile communication module that accesses a mobile communication network to perform communications according to various types of communication standards such as $3^{rd}$ Generation (3G), $3^{rd}$ Generation Partnership Project (3GPP), Long Term Evolution (LTE), etc.

The wired communication module 125 may be an interface module that transmits a content converted to correspond to an HDR content to the display apparatus 200 connected through a wire cable according to a control command of the processor 130. The wired communication module 125 may be realized through a High Definition Multimedia Interface (HDMI), a Universal Serial Bus (USB), IEEE 1394, or the like.

The processor 130 acquires gamma information applied to an SDR content, which is input along with corresponding metadata, based on the metadata input through the input interface 110. The processor 130 converts the SDR content into a content corresponding to an HDR content outputtable on the display apparatus 200 by using content conversion information pre-stored in relation to the acquired gamma information and outputs the corresponding content to the communicator 120. Therefore, the communicator 120 may transmit the content, which is converted to correspond to the HDR content outputtable on the display apparatus 200 in relation to the SDR content, to the display apparatus 200.

If the content converted to correspond to the HDR content is received from the content outputting apparatus 100, the display apparatus 200 may gamma-correct the content received from the content outputting apparatus 100 by using gamma information preset to be applied to the HDR content, signal-process the gamma-corrected content in a form that may be output, and display the signal-processed content on a screen.

In detail, as shown in FIG. 3, if an SDR content and metadata of the SDR content are input through the input interface 110, a data processor 150 decodes the SDR content based on the input metadata. Here, the metadata may include VUI or SEI including at least one selected from encoding information of the SDR content, gamma information applied to the SDR content, resolution information, and up-scale ratio information.

According to an exemplary embodiment, a BD may include an SDR content that is encoded through a codec having a MPEG-2, H.264/MPEG-4 AVC, or VC-1 standard. Therefore, the data processor 150 may decode the input SDR content based on the encoding information of the metadata of the SDR content input through the input interface 110.

The processor 130 may determine whether the VUI or SEI of the metadata of the SDR content input through the input interface 110 includes the gamma information applied to the SDR content. If it is determined that the VUI or SEI includes the gamma information applied to the SDR content, the processor 130 acquires the gamma information included in the VUI or SEI and converts the SDR content into a content corresponding to the HDR content outputtable on the display apparatus 200 by using content conversion information pre-stored in relation to the acquired gamma information.

Here, the content conversion information may be a lookup table for converting SDR pixel values of each image frame of the input SDR content into HDR pixel values having a characteristic of the HDR content outputtable on the display apparatus 200. Therefore, if the gamma information applied to the SDR content is acquired from the VUI or SEI included in the metadata of the input SDR content, the processor 130 converts SDR pixel values of each image frame of the decoded SDR content into HDR pixel values having the characteristic of the HDR content outputtable on the display apparatus 200 by using the content conversion information pre-stored in relation to the acquired gamma information.

According to an exemplary embodiment, HDR pixel values having a characteristic of an HDR content outputtable on the display apparatus 200 may be set to respectively correspond to SDR pixel values of each image frame of the SDR content. For example, SDR pixel values of an 8-bit image content may exist between 0 and 255. In this case, HDR pixel values may set to respectively correspond to SDR pixel values. Therefore, the processor 130 may convert the SDR content into a content having the characteristic of the HDR content outputtable on the display apparatus 200, by using HDR pixel values respectively corresponding to SDR pixel values of each image frame of the SDR content based on the lookup table that is the content conversion information.

According to another exemplary embodiment, HDR pixel values having a characteristic of an HDR content outputtable on the display apparatus 200 may be set to correspond to some SDR pixel values of each image frame of the SDR content. For example, SDR pixel values of an 8-bit image content may exist between 0 and 255, and HDR pixel values may be set to correspond to some of the SDR pixel values. In this case, the processor 130 may perform interpolation processing to determine HDR pixel values corresponding to other SDR pixel values based on the HDR pixel values corresponding to some of the SDR pixel values based on the lookup table that is the content conversion information.

For example, in the lookup table, a $0^{th}$ HDR pixel value may be set to correspond to a $0^{th}$ SDR pixel value, and a fourth HDR pixel value may be set to correspond to a fourth SDR pixel value. In this case, the processor 130 may determine HDR pixel values respectively corresponding to other SDR pixel values (i.e., first through third SDR pixel values) by using an arbitrary interpolation method of the $0^{th}$ and fourth HDR pixel values.

If SDR pixel values of each image frame of an SDR content are determined as described above, the processor 130 may convert the SDR content into a content having a characteristic of an HDR content outputtable on the display apparatus 200 by using HDR pixel values respectively corresponding to SDR pixel values of each image frame of the SDR content.

Therefore, if a content that is converted into HDR pixel values is received from the content outputting apparatus 100, the display apparatus 200 may gamma-correct the received content by using gamma information preset to be applied to an HDR content, signal-process the gamma-corrected content in a form that may be output, and display the signal-processed content.

The content conversion information described above may be stored in the storage 140. The storage 140 may store content conversion information respectively corresponding to a plurality of pieces of gamma information applicable to the SDR content. HDR pixel values that are set to correspond to SDR pixel values on a one-to-one basis or correspond to some of the SDR pixel values may be calculated by a predefined conversion expression in relation to a plurality of pieces of gamma information applicable to the SDR content without additional color processing. Therefore, the storage 140 may store content conversion information matching with the SDR pixel values of the SDR content and the HDR pixel values calculated to correspond to the SDR pixel values according to each of the plurality of pieces of gamma information applicable to the SDR content.

The storage 140 may also store an operating system (OS) necessary for operating the display apparatus 200, various types of programs or data, etc. Also, the storage 140 may perform a data communication with the display apparatus 200 through the communicator 120 to store output resolution information of the display apparatus 200 and various types of data such as gamma information, etc.

Therefore, if the gamma information applied to the SDR content is acquired from the VUI or SEI included in the metadata of the input SDR content, the processor 130 may acquire content conversion information related to pre-acquired gamma information from content conversion information of each of the plurality of pieces of gamma information applicable to the SDR content stored in the storage 140. The processor 130 may determine HDR pixel values corresponding to SDR pixel values of each image frame of the decoded SDR content from the acquired content conversion information. Here, the SDR pixel values of each image frame may be pixel values that are within a range where an image quality having a maximum brightness of about 100 nit (Cd/m2) level in a general content standard may be realized. For example, 8-bit SDR pixel values may be values at which pixel expressions are possible within pixel values between 0 and 255.

The processor 130 may convert the SDR content into a content having the characteristic of the HDR content outputtable on the display apparatus 200 by using HDR pixel values respectively corresponding to SDR pixel values of each image frame of the SDR content and transmit the content to the display apparatus 200.

If the gamma information applied to the SDR content does not exist in the VUI or SEI of the metadata of the input SDR content, the processor 130 may determine gamma information of the SDR content based on resolution information of the SDR content included in the metadata. For example, gamma information of ITU-R BT.1886 or ITU-R BT.1361 may be set for an SDR content having a high resolution such as Full High-Definition (FHD) or High-Definition (HD). Gamma information of SMPTE 170M-2004 or ITU-R BT.1358 may set for an SDR content having a low resolution such as Standard Definition (SD).

Therefore, the processor 130 may determine gamma information related to the resolution information included in the VUI or SEI from gamma information preset for each resolution and acquire content conversion information related to the determined gamma information. The processor 130 determines HDR pixel values corresponding to SDR pixels of each image frame of the decoded SDR content from the acquired content conversion information. The processor 130 converts the SDR content into a content having the characteristic of the HDR content outputtable on the display apparatus 200 by using the HDR pixel values respectively corresponding to the SDR pixel values of each image frame of the SDR content and transmits the content to the display apparatus 200.

Here, the processor 130 may transmit content information including information(gamma information) for gamma-correcting the corresponding content in the display apparatus 200 along with the content converted to have the characteristic of the HDR content to the display apparatus 200. Therefore, the display apparatus 200 may gamma-correct the content converted to have the characteristic of the HDR content based on gamma information included in content information received from the content outputting apparatus 100, signal-process the gamma-corrected content in a form that may be output, and display the signal-processed content.

However, the exemplary embodiments are not limited thereto, and the processor 130 may transmit content information including null information for gamma-correcting the corresponding content in the display apparatus 200 to the display apparatus 200 along with the content converted to have the characteristic of the HDR content. If the content information including the null information is received, the display apparatus 200 may gamma-correct the content converted to have the characteristic of the HDR content by using default gamma information, signal-process the gamma-corrected content in a form that may be output, and display the signal-processed content.

The processor 130 may receive EDID from the display apparatus 200 through the communicator 120. Here, the EDID may be content playing-related spec information of the display apparatus 200. If the EDID is received, the processor 130 may determine whether the display apparatus 200 is capable of playing the HDR content, based on the received EDID before converting the SDR content into the content having the characteristic of the HDR content and, if it is determined that the display apparatus 200 is capable of playing the HDR content, convert the SDR content into the content having the characteristic of the HDR content.

The EDID received from the display apparatus 200 may include information for gamma-correcting the HDR content. In this case, the processor 130 may acquire content conversion information based on gamma information acquired from the VUI or SEI of the metadata of the SDR content and the gamma information included in the EDID from a plurality of pieces of content conversion information pre-stored in the storage 140. The processor 130 determines HDR pixel values corresponding to SDR pixel values of each image frame of the decoded SDR content from the acquired content conversion information. The processor 130 converts the SDR content into a content having the characteristic of the HDR content outputtable on the display apparatus 200 by using the HDR pixel values respectively corresponding to the SDR pixel values of each image frame of the SDR content and transmits the content to the display apparatus 200.

Therefore, the display apparatus 200 may gamma-correct the content converted to have the characteristic of the HDR content received from the content outputting apparatus 100 by using preset gamma information, signal-process the gamma-corrected content in a form that may be output, and display the signal-processed content.

Elements of the display apparatus 200 will now be described in detail.

Figure 4:
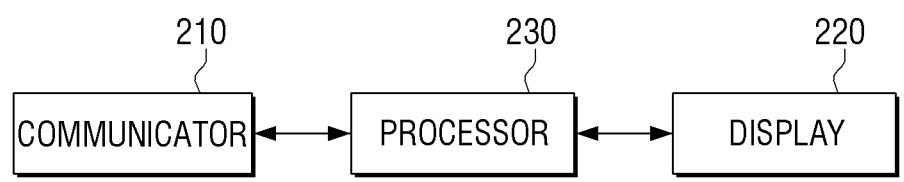
FIG. 4 is a block diagram of a display apparatus according to an exemplary embodiment.

FIG. 4 is a block diagram of a display apparatus according to an exemplary embodiment.

As shown in FIG. 4, the display apparatus 200 includes a communicator 210, a display 220, and a processor 230.

The communicator 210 performs a data communication with the content outputting apparatus 100 to receive a content from the content outputting apparatus 100. Here, the content received from the content outputting apparatus 100 may be a content that is converted into a content corresponding to an HDR content. The communicator 210 may be realized as various types of communication modules as described with reference to FIG. 3.

The display 220 may be an element that displays various types of data processed according to a control command of the processor 230 and a content signal-processed in relation to the content received through the communicator 210 on a screen. The display 220 may be, for example, an all-in-one type with a touch panel for receiving a touch command of a user. In this case, the display 220 may display the various types of data processed according to the control command of the processor 230 and the signal-processed content on the screen and receive the touch command of the user through the touch panel.

If the content is received from the content outputting apparatus 100 through the communicator 210, the processor 230 corrects an image quality of the corresponding content by using image quality information preset to be applied to the received content. The processor 230 signal-processes the image-quality-corrected content in a form that may be output and controls the display 220 to display the signal-processed content.

According to an exemplary embodiment, if a content corresponding to an HDR content is received through the communicator 210, the processor 230 gamma-corrects the content corresponding to the HDR content received from the content outputting apparatus 100, by using gamma information preset to be applied to the HDR content. The processor 230 may signal-process the gamma-corrected content in a form that may be output and display the signal-processed content through the display 220.

According to another exemplary embodiment, the content outputting apparatus 100 may transmit a content converted to be outputtable on the display apparatus 200 and content conversion information applied to the corresponding content to the display apparatus 200. If the content and the content conversion information applied to the content are received, the processor 230 acquires gamma information related to the received content conversion information from a plurality of pieces of pre-stored gamma information and gamma-corrects the content received from the content outputting apparatus 100 based on the acquired gamma information. The processor 230 may signal-process the gamma-corrected content in a form that may be output and display the signal-processed content through the display 220.

As shown in FIG. 3, the content outputting apparatus 100 may further include a user input interface 160. The user input interface 160 may receive a user command from a remote control device (not shown) that controls an operation of the content outputting apparatus 100. In detail, the remote control device may transmit a user command, such as a content execution command, a function setting command of the content outputting apparatus 100, or the like, to the content outputting apparatus 100 through a control signal such as an infrared (IR) signal, a radio frequency (RF) signal, or the like. Therefore, the user input interface 160 may execute the content based on a control signal received through the remote control device or may set a function corresponding to the control signal.

Content conversion information according to some exemplary embodiments will now be described in detail.

Figure 5:
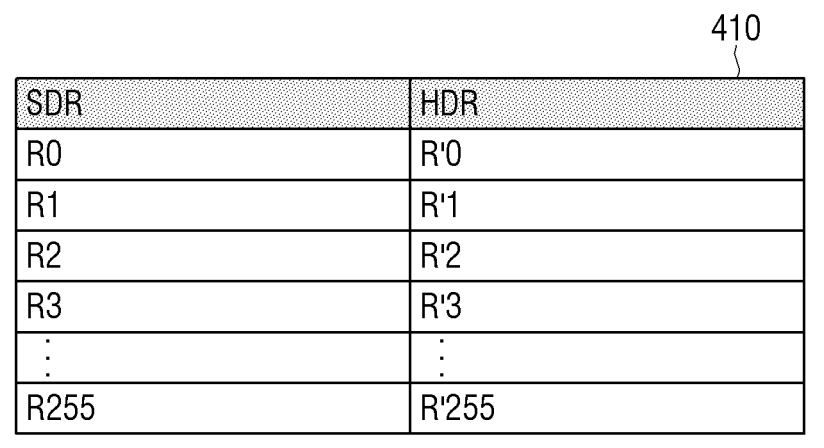

FIG. 5 illustrates content conversion information for converting an SDR content into a content having a characteristic of an HDR content, according to an exemplary embodiment. FIG. 6 illustrates content conversion information for converting an SDR content into a content having a characteristic of an HDR content, according to another exemplary embodiment.

As described above, the storage 140 may store a lookup table that is content conversion information respectively corresponding to a plurality of pieces of gamma information applicable to an SDR content.

For example, SDR pixel values of each of R, G, and B pixels of an 8-bit SDR content may exist between 0 and 255, and first gamma information of a plurality of pieces of gamma information applicable to the SDR content may be applied to the SDR content. As shown in FIG. 5, SDR pixel values R0 through R255 corresponding to R pixels of the 8-bit SDR content, to which the first gamma information is applied, may be stored in a lookup table 410. HDR pixel values R'0 through R'255 respectively corresponding to the SDR pixel values R0 through R255 of the R pixels of the 8-bit SDR content may match with the SDR pixel values R0 through R255 corresponding to the R pixels and then may be stored in the lookup table 410. Here, the HDR pixel values R'0 through R'255 may be values for gamma-correcting an SDR convent converted to have a characteristic of an HDR content by using first gamma information of a plurality of pieces of gamma information applicable to the HDR content.

In other words, the lookup table 410 may store 256 SDR pixel values R0 through R255 of the 8-bit SDR content to which the first gamma information is applied and the HDR pixel values R'0 through R'255 that are calculated to respectively correspond to the SDR pixel values R0 through R255 in order to gamma-correct the content converted to have the characteristic of the HD content in relation to the SDR content by using the first gamma information. Here, the SDR pixel values R0 through R255 match with the HDR pixel values R'0 through R'255 on a one-to-one basis and then stored in the storage 140.

Therefore, the processor 130 may extract HDR pixel values corresponding to SDR pixel values of each image frame of the SDR content to which the first gamma information is applied, by using the lookup table 410 pre-stored in the storage 140 and convert the SDR content into a content having a characteristic of the HDR content outputtable on the display apparatus 200 based on the extracted HDR pixel values.

As shown in FIG. 6, a lookup table 510 may store SDR pixel values R0, R5, R10, . . . , and R255of SDR pixel values R0through R255of a 8-bit SDR content between 0 and 255, wherein first gamma information is applied to the 8-bit SDR content, and the SDR pixel values R0, R5, R, 10, . . . , and R255 are set using a five-unit interval. Also, HDR pixel values R'0, R'5, R'10, . . . , and R'255 respectively corresponding to the SDR pixel values R0, R5, R10, . . . , and R255 set using the five-unit interval may match with the SDR pixel values R0, R5, R10, . . . , and R255and then stored in the lookup table 510. Here, the HDR pixel values R'0, R'5, R'10, . . . , and R'255 may be values for gamma-correcting the SDR content converted to have a characteristic of an HDR content by using first gamma information of a plurality of pieces of gamma information applicable to the HDR content.

In other words, the lookup table 510 may store 52 SDR pixel values R0, R5, R10, . . . , and R255 of the 8-bit SDR content to which the first gamma information is applied and the HDR pixel values R'0, R'5, R'10, . . . , and R'255 that are calculated to respectively correspond to the SDR pixel values R0, R5, R10, . . . , and R255in order to gamma-correct the content converted to have the characteristic of the HDR content in relation to the SDR content by using first gamma information. Here, the SDR pixel values R0, R5, R10, . . . , and R255match with the HDR pixel values R'0, R'5, R'10, . . . , and R'255 and are then stored in the storage 140.

As described above, the lookup table 510 may store some of 256 SDR pixel values of an 8-bit SDR content and HDR pixel values respectively corresponding to some SDR pixel values to efficiently use a memory size of the storage 140.

The processor 130 extracts HDR pixel values corresponding to some of the SDR pixel values of each image frame of an SDR content to which first gamma information is applied, by using the lookup table 510 pre-stored in the storage 140. The processor 130 may determine HDR pixel values corresponding to other SDR pixel values based on the extracted HDR pixel values. For example, if HDR pixel value R'0 and HDR pixel value R'5 are extracted, the processor 130 may determine HDR pixel values R'1 through R'4 by using any desired interpolation method of the HDR pixel values R'0 and R'5. As described above, if HDR pixel values respectively corresponding to SDR pixel values of each image frame of an SDR content are extracted and determined, the processor 130 may convert the SDR content into a content having a characteristic of an HDR content outputtable on the display apparatus 200, based on the HDR pixel values respectively corresponding to the SDR pixel values.

FIG. 7 illustrates VUI or SEI of metadata of an SDR content, according to an exemplary embodiment.

The metadata of the SDR content shown in FIG. 7 indicates that the SDR content is produced based on an H.264 codec and includes VUI or SEI 610. As described above, the VUI or SEI 610 may include at least one selected from encoding information of the SDR content, gamma information applied to the SDR content, resolution information, and up-scale ratio information.

Therefore, the processor 130 may acquire the gamma information applied to the SDR content from the VUI or SEI 610 included in the metadata. As shown in FIG. 6, the VUI or SEI 610 may include National Television System Committee (NTSC) standard gamma value 2.2. This case indicates that gamma information about standard gamma value 2.2 is applied to the SDR content. Therefore, the processor 130 may convert the SDR content into a content having an HDR content outputtable on the display apparatus 200 by using a lookup table of content conversion information corresponding to gamma information of gamma value 2.2 among content conversion information corresponding to a plurality of pieces of gamma information applicable to the SDR content pre-stored in the storage 140.

The VUI or SEI 610 may include Phase Alternation Line (PAL) standard gamma value 2.8. This case indicates that gamma information of standard gamma value 2.8 is applied to the SDR content. Therefore, the processor 130 may convert the SDR content into a content having a characteristic of an HDR content outputtable on the display apparatus 200, by using a lookup table of content conversion information corresponding to gamma information of gamma value 2.8 among content conversion information corresponding to a plurality of pieces of gamma information applicable to the SDR content pre-stored in the storage 140.

Figure 8:
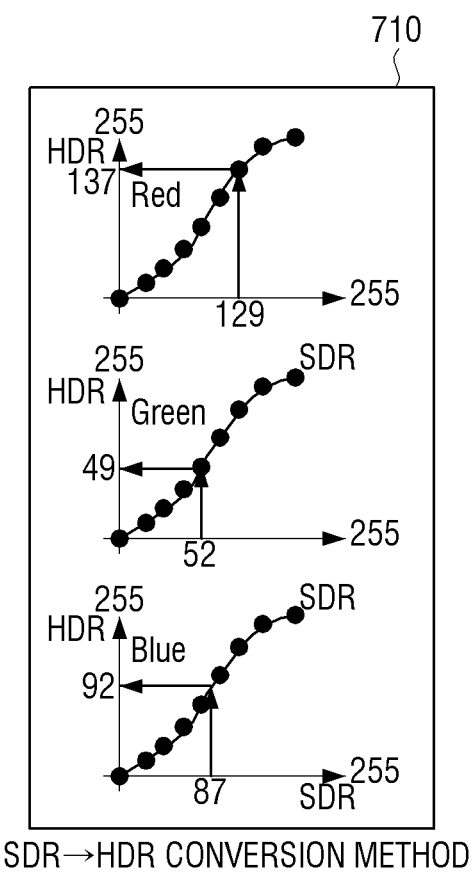
FIG. 8 illustrates conversions of SDR pixel values of an SDR content into HDR pixel values based on content conversion information in a content outputting apparatus, according to an exemplary embodiment.
Figure 9:
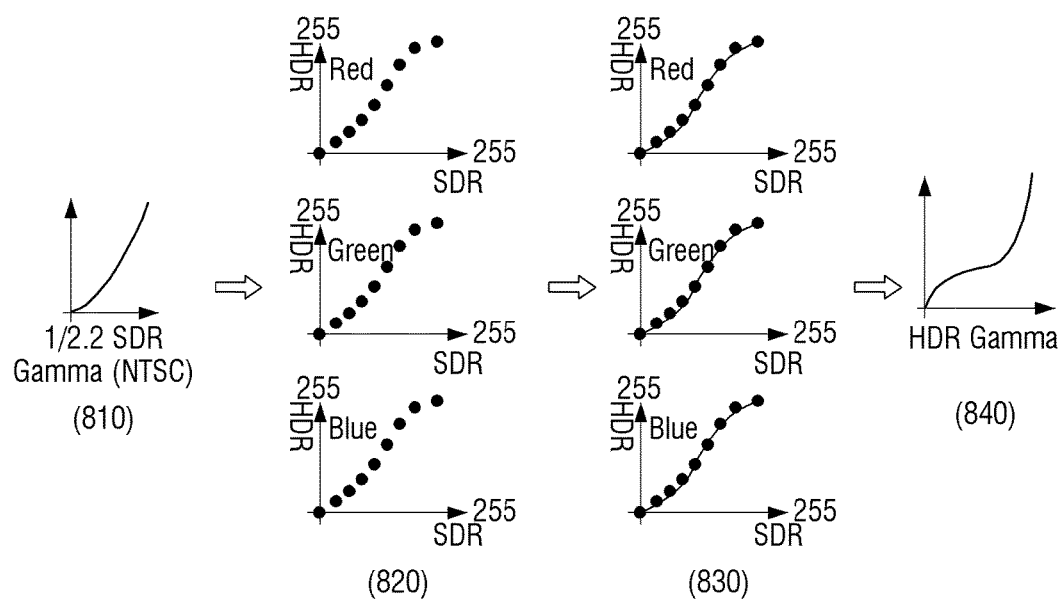
FIG. 9 illustrates gamma curves depending on conversions of SDR pixel values of an SDR content into HDR pixel values in a content outputting apparatus, according to an exemplary embodiment.

FIG. 8 illustrates a conversion of SDR pixel values of an SDR content into HDR pixel values based on content conversion information in a content outputting apparatus, according to an exemplary embodiment. FIG. 9 illustrates gamma curves depending on conversions of SDR pixel values of an SDR content into HDR pixel values in a content outputting apparatus, according to an exemplary embodiment.

As described with reference to FIGS. 5 and 6, SDR pixel values R, G, and B of an 8-bit SDR content may exist between 0 and 255, and first gamma information of a plurality of pieces of gamma information applicable to the SDR content may be applied to the SDR content. The SDR pixel values R, G, and B of the 8-bit SDR content, to which the first gamma information is applied and which are between 0 and 255, or some of the SDR pixel values R, G, and B may be stored in a lookup table that is content conversion information. HDR pixel values R', G', and B' respectively corresponding to the SDR pixel values R, G, and B of the 8-bit SDR content between 0 and 255 or some of the SDR pixel values R, G, and B may match with the SDR pixel values R, G, and B pre-stored in a lookup table and then stored in the lookup table.

If a lookup table related to gamma information of an input SDR content is detected from lookup tables, the processor 130 may extract HDR pixel values R', G', and B' corresponding to SDR pixel values R, G, and B of each image frame of the SDR content by using the detected lookup table.

As shown in FIG. 8, particular SDR pixel values R, G, and B of each image frame of an SDR content may be 129, 52, and 87, and HDR pixel values R, G, and B 129, 52, and 87 may be detected from a lookup table in relation to the particular SDR pixel values R, G, and B 129, 52, and 87. If HDR pixel values corresponding to SDR pixel values of each image frame of an SDR content are extracted through the above-described method, the processor 130 converts the SDR pixel values of each image frame of the SDR content into HDR pixel values corresponding to the SDR pixel values. Therefore, the SDR content may be converted into a content having a characteristic of an HDR content outputtable on the display apparatus 200.

In some exemplary embodiments, as shown in FIG. 9, if NTSC standard gamma value 2.2 is applied to an SDR content, a gamma curve of the SDR content may be formed as a nonlinear gamma curve 810. The processor 130 may extract HDR pixel values R', G' and B' corresponding to some of SDR pixel values R, G, and B of each image frame of the SDR content based on a lookup table related to standard gamma value 2.2 (820). The processor 130 may perform interpolation-processing to determine HDR pixel values R', G', and B' corresponding to other SDR pixel values R, G, and B from the HDR pixel values R', G', and B' corresponding to the SDR pixel values R, G, and B. If the HDR pixel values R', G', and B' corresponding to the SDR pixel values R, G, and B of each image frame of the SDR content are detected through a series of processes described above (830), the processor 130 may convert the SDR content into a content having a characteristic of an HDR content based on an HDR gamma curve 840 that is generated based on the HDR pixel values R', G', and B' corresponding to the SDR pixel values R, G, and B of each image frame of the SDR content.

Figure 10:
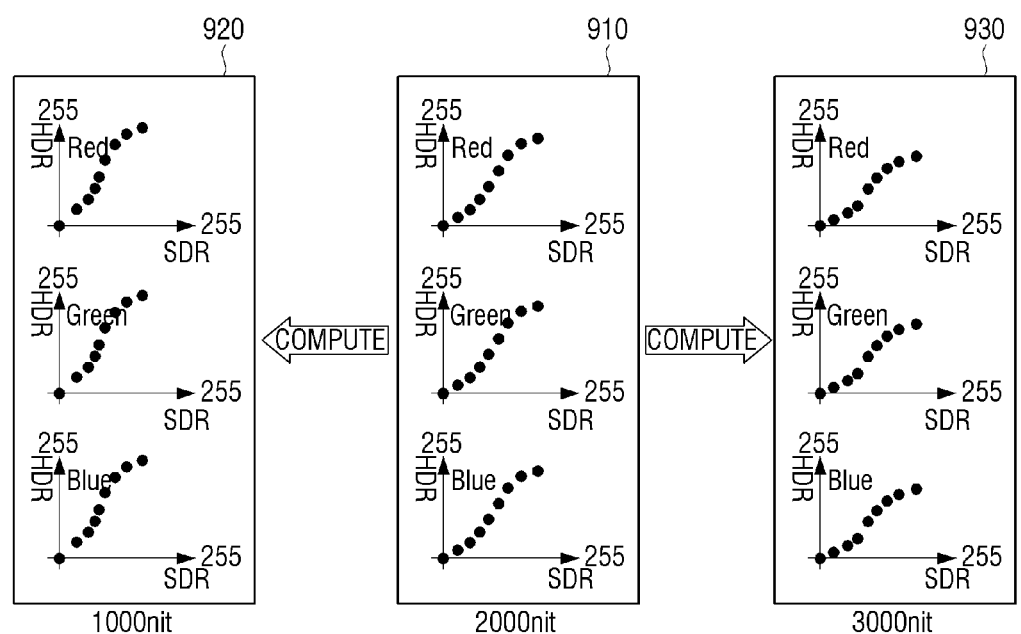
FIG. 10 illustrates a reproduction of content conversion information based on luminance information of a display apparatus in a content outputting apparatus, according to an exemplary embodiment.

FIG. 10 illustrates content conversion information that is reproduced based on luminance information of a display apparatus in a content outputting apparatus, according to an exemplary embodiment.

Content conversion information stored in the storage 140 may store gamma information applied to an SDR content, SDR pixel values of each image frame of the SDR content, and HDR pixel values respectively corresponding to the SDR pixel values. Here, the SDR pixel values and the HDR pixel values match based on maximum luminance information of the display apparatus 200 and then are stored in the content conversion information.

In some exemplary embodiments, the content conversion information may store the SDR pixel values of the SDR content and the HDR pixel values respectively corresponding to the SDR pixel values, wherein the SDR pixel values and the HDR pixel values match and then are stored in the content conversion information. Here, the HDR pixel values may be values that are calculated in consideration of maximum luminance value 2000 nit of the display apparatus 200. When the content conversion information is pre-stored in the storage 140, luminance information indicating maximum luminance value 1000 nit or maximum luminance value 3000 nit may be received from the display apparatus 200.

According to exemplary embodiments, if luminance information indicating luminance value 1000 nit is received from the display apparatus 200, the processor 130 may adjust HDR pixel values respectively corresponding to SDR pixel values stored in content conversion information to be higher than or equal to a threshold value corresponding to a preset extension condition. Therefore, the processor 130 may convert the SDR content into a content having a characteristic of an HDR content based on extended content conversion information having a gamma curve 920 having a larger gradient than a gamma curve 910 of the pre-stored content conversion information.

If luminance information indicating maximum luminance value 3000 nit is received from the display apparatus 200, the processor 130 may adjust the HDR pixel values respectively corresponding to the SDR pixel values stored in the content conversion information to be lower than the threshold value corresponding to the preset extension condition. Therefore, the processor 130 may convert the SDR content into a content having a characteristic of an HDR content based on extended content conversion information having a gamma curve 930 having a lower gradient than the gamma curve 910 of the pre-stored content conversion information.

An operation of the content outputting apparatus 100 converting an SDR content into a content having a characteristic of an HDR content outputtable on the display apparatus 200 has been described. Hereinafter, a method of converting an SDR content into a content having a characteristic of an HDR content outputtable on the display apparatus 200 in the content outputting apparatus 100 according to exemplary embodiments will be described in detail, according to some exemplary embodiments.

Figure 11:
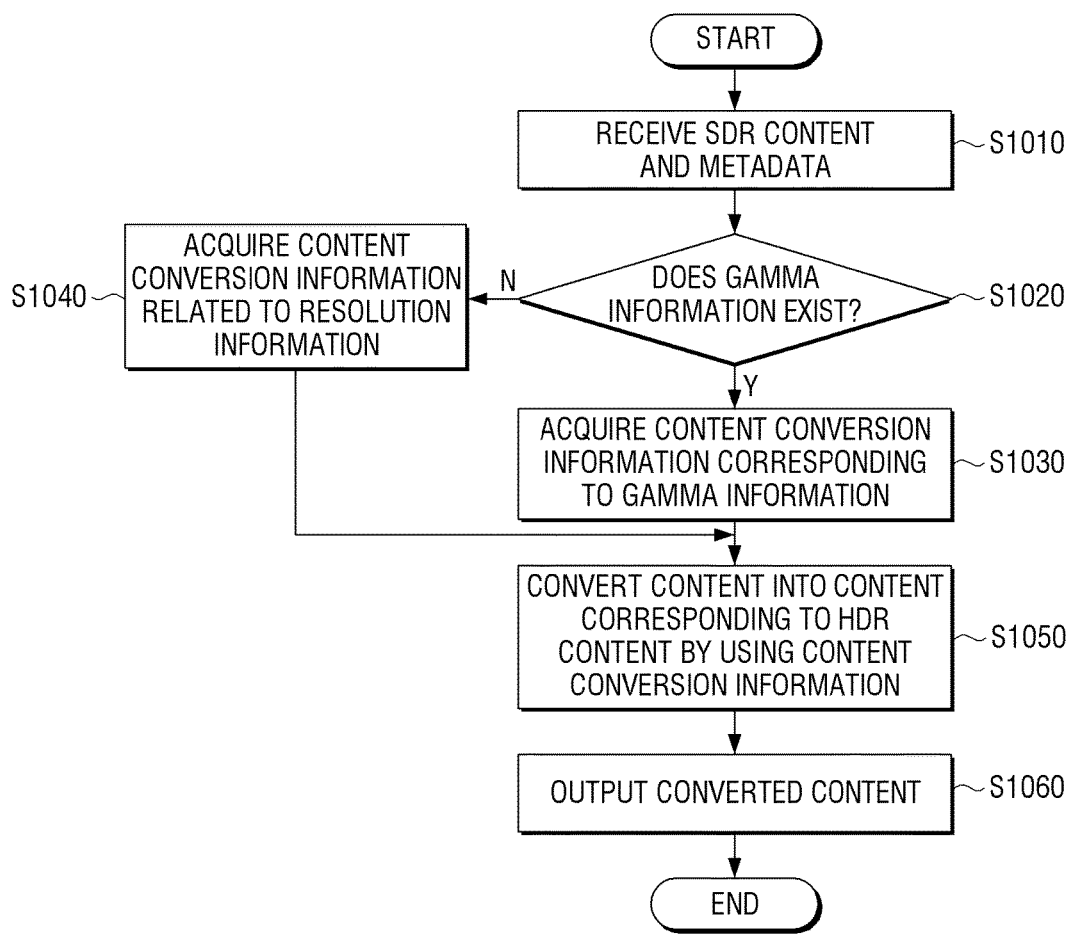
FIG. 11 is a flowchart of a method of outputting a content from a content outputting apparatus to a display apparatus, according to an exemplary embodiment.

FIG. 11 is a flowchart of a method of outputting a content from a content outputting apparatus to a display apparatus, according to an exemplary embodiment.

As shown in FIG. 11, in operation S1010, the content outputting apparatus 100 receives an SDR content stored on a recording medium such as a DVD or a BD and metadata of the SDR content. Here, the metadata may include VUI or SEI including at least one selected from encoding information of the SDR content, gamma information applied to the SDR content, resolution information, and up-scale ratio information.

If the SDR content and the metadata of the SDR content are input, the content outputting apparatus 100 determines whether the VUI or SEI included in the input metadata includes gamma information applied to the SDR content in operation S1020.

If it is determined in operation S1020 that the VUI or SEI included in the metadata includes the gamma information applied to the SDR content, the content outputting apparatus 100 acquires the gamma information applied to the SDR content from the VUI or SEI and acquires content conversion information related to the acquired gamma information in operation S1030.

Here, the content conversion information may be a lookup table for converting SDR pixel values of each image frame of the input SDR content into HDR pixel values having a characteristic of an HDR content outputtable on the display apparatus 200. The content conversion information may be set in order to respectively correspond to a plurality of pieces of gamma information applicable to the SDR content. The content conversion information respectively corresponding to the plurality of pieces of gamma information may be stored in a storage unit of the content outputting apparatus 100.

If the gamma information applied to the SDR content is acquired from the VUI or SEI included in the metadata of the input SDR content, the content outputting apparatus 100 may acquire content conversion information related to the acquired gamma information from a plurality of pieces of pre-stored content conversion information.

If it is determined in operation S1020 that the VUI or SEI included in the metadata does not include the gamma information applied to the SDR content, the content outputting apparatus 100 acquires content conversion information based on resolution information of the SDR content included in the VUI or SEI in operation S1040. In detail, the content outputting apparatus 100 determines the gamma information applied to the SDR content based on the resolution information of the SDR content included in the VUI or SEI. For example, gamma information of ITU-R BT.1886 or ITU-R BT.1361 may be set for an SDR content having a high resolution such as FHD or HD, and gamma information of SMPTE 170M-2004 or ITU-R BT.1358 may be set for an SDR content having a low resolution such as SD.

Therefore, the content outputting apparatus 100 determines the gamma information related to the resolution information included in the VUI or SEI from gamma information preset according to each resolution. The content outputting apparatus 100 may acquire content conversion information corresponding to the gamma information related to the resolution information from content conversion information pre-stored in order to correspond to a plurality of pieces of gamma information applicable to the SDR content.

If the content conversion information is acquired based on the gamma information or the resolution information included in the VUI or SEI, the content outputting apparatus 100 converts the SDR content into a content corresponding to an HDR content outputtable on the display apparatus 200, by using the acquired content conversion information in operation S1050.

As described above, the content conversion information may be a lookup table for converting SDR pixel values of each image frame of an input SDR content into HDR pixel values having a characteristic of an HDR content outputtable on the display apparatus 200. Therefore, the content outputting apparatus 100 converts the SDR pixel values of each image frame of the SDR content into the HDR pixel values having the characteristic of the HDR content outputtable on the display apparatus 200, by using the acquired content conversion information.

According to an exemplary embodiment, HDR pixel values having a characteristic of an HDR content outputtable on the display apparatus 200 may be set in order to respectively correspond to SDR pixel values of each image frame of an SDR content. Therefore, the content outputting apparatus 100 may convert the SDR content into a content having the characteristic of the HDR content outputtable on the display apparatus 200 by using the HDR pixel values respectively corresponding to the SDR pixel values of each image frame of the SDR content based on a lookup table included in content conversion information.

According to another exemplary embodiment, HDR pixel values having a characteristic of an HDR content outputtable on the display apparatus 200 may be set in order to corresponding to selected SDR pixel values of each image frame of an SDR content. In this case, the content outputting apparatus 100 determines HDR pixel values corresponding to other SDR pixel values from HDR pixel values corresponding to the selected SDR pixel values based on a lookup table included in content conversion information. The content outputting apparatus 100 may convert the SDR content into a content having a characteristic of an HDR content outputtable on the display apparatus 200 by using the HDR pixel values corresponding to the selected SDR pixel values and the HDR pixel values determined in relation to the other SDR pixel values.

The content outputting apparatus 100 transmits the content converted to have the characteristic of the HDR content outputtable on the display apparatus 200 in relation to the SDR content to the display apparatus 200.

Here, the content outputting apparatus 100 may transmit content information including information for gamma-correcting the corresponding content in the display apparatus 200 along with the content converted to have the characteristic of the HDR content to the display apparatus 200. Therefore, the display apparatus 200 may gamma-correct the content converted to have the characteristic of the HDR content based on the gamma information included in the content information received from the content outputting apparatus 100, signal process the gamma-corrected content in a form that may be output, and display the signal-processed content.

However, the exemplary embodiments are not limited thereto, and the content outputting apparatus 100 may transmit the content information including null information for gamma-correcting the corresponding content in the display apparatus 200 along with the content converted to have the characteristic of the HDR content to the display apparatus 200. If the content information including the null information is received, the display apparatus 200 may gamma-correct the content converted to have the characteristic of the HDR content by using default gamma information, signal-process the gamma-corrected content in a form that may be output, and display the signal-processed content.

If EDID is received from the display apparatus 200, the content outputting apparatus 100 may determine whether the display apparatus 200 is capable of playing an HDR content, based on the received EDID before converting the SDR content into the content having the characteristic of the HDR content. Here, the EDID may be content-playing-related specification information of the display apparatus 200. If the display apparatus 200 is determined to be capable of playing the HDR content based on the EDID, the content outputting apparatus 100 may convert the SDR content into the content having the characteristic of the HDR content.

The EDID received from the display apparatus 200 may include information for gamma-correcting the HDR content. In this case, the content outputting apparatus 100 may acquire content conversion information from a plurality of pieces of pre-stored content conversion information based on gamma information acquired from VUI or SEI of metadata of the SDR content and gamma information included in the EDID. The content outputting apparatus 100 determines HDR pixel values corresponding to SDR pixel values of each image frame of the SDR content from the acquired content conversion information. The content outputting apparatus 100 may convert the SDR content into the content having the characteristic of the HDR content outputtable on the display apparatus 200 by using HDR pixel values respectively corresponding to SDR pixel values of each image frame of the SDR content and transmit the content to the display apparatus 200.

Therefore, the display apparatus 200 may gamma-correct the content converted to have the characteristic of the HDR content received from the content outputting apparatus 100 by using preset gamma information, signal-process the gamma-corrected content in a form that may be output, and display the signal-processed content.

A process performed according to an exemplary embodiment may be stored in program form on a non-transitory computer readable medium. The non-transitory computer readable medium may be a medium which does not store data temporarily such as a register, cache, and memory, but instead stores data semi-permanently and is readable by devices.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus for outputting a content to a display, the apparatus comprising:
a communicator configured to perform a data communication with the display;
an input interface; and
a processor configured to:
receive a content and metadata associated with the content through the input interface,
identify first gamma information applied to the content based on the metadata,
receive Extended Display Indentification Data (EDID) of the display including a second gamma information from the display through the communicator,
determine whether the display is capable of playing a High Dynamic Range (HDR) content based on the received EDID,
convert the content into the HDR content by converting pixel values of image frames of the content based on the first gamma information and the second gamma information in response to determining that the display is capable of playing the HDR content, and
control the communicator to output the HDR content to the display.

2. The apparatus of claim 1, wherein the content comprises a Standard Dynamic Range (SDR) content.

3. The apparatus of claim 2, wherein the content is converted based on a lookup table for converting SDR pixel values of image frames of the SDR content into HDR pixel values having a characteristic of the HDR content,
wherein the display is further configured to gamma-correct the HDR content by using gamma information predetermined to be applied to the HDR content.

4. The apparatus of claim 2, further comprising:
a storage configured to store a plurality of pieces of content conversion information corresponding to a plurality of pieces of gamma information applicable to the SDR content,
wherein the processor is further configured to acquire the first gamma information and the second gamma information from the storage.

5. The apparatus of claim 2, wherein the processor is further configured to determine whether at least one from among Video Usability Information (VUI) or Supplemental Enhancement Information (SEI) of the metadata includes the first gamma information applied to the SDR content.

6. The apparatus of claim 2, wherein the processor is further configured to control the communicator to transmit to the display content information comprising information for gamma-correcting the HDR content in the display.

7. The apparatus of claim 2, further comprising:
a storage configured to store a plurality of pieces of content conversion information corresponding to a plurality of pieces of gamma information applicable to the SDR content,
wherein the processor is further configured to acquire the first gamma information and the second gamma information.

8. The apparatus of claim 3, wherein the HDR pixel values correspond to the SDR pixel values of the image frames of the SDR content, and
wherein the processor is further configured to convert the SDR pixel values of the image frames of the SDR content into the HDR pixel values based on the lookup table.

9. The apparatus of claim 3, wherein the HDR pixel values correspond to a subset of the SDR pixel values of the image frames of the SDR content,
wherein the processor is further configured to determine other HDR pixel values corresponding to other SDR pixel values from the HDR pixel values corresponding to the subset of the SDR pixel values based on the lookup table.

10. A method of outputting a content from a content outputting apparatus to a display, the method comprising:
receiving a content and metadata associated with the content;
identifying first gamma information applied to the content based on the metadata;
receiving Extended Display Identification Data (EDID) of the display including second gamma information from the display;
determining whether the display is capable of playing a High Dynamic Range (HDR) content based on the received EDID;
converting the content into the HDR content by converting pixel values of image frames of the content based on the first gamma information and the second gamma information in response to determining that the display is capable of playing the HDR content; and
outputting the HDR content to the display.

11. The method of claim 10, wherein the content includes an SDR content.

12. The method of claim 11, wherein the content is converted based on a lookup table for converting SDR pixel values of image frames of the SDR content into HDR pixel values having a characteristic of the HDR content,
wherein the display gamma-corrects the HDR content by using gamma information predetermined to be applied to the HDR content.

13. The method of claim 11, wherein the acquiring further comprises acquiring the first gamma information and the second gamma information from a plurality of pieces of gamma information applicable to a pre-stored SDR content.

14. The method of claim 11, wherein the acquiring further comprises determining whether at least one from among Video Usability Information (VUI) or Supplemental Enhancement Information (SEI) of the metadata includes the first gamma information applied to the SDR content.

15. The method of claim 11, wherein the outputting further comprises transmitting content information including information for gamma-correcting the HDR content in the display to the display.

16. The method of claim 12, wherein the HDR pixel values correspond to the SDR pixel values of the image frames of the SDR content,
wherein the converting further comprises converting the SDR pixel values of the image frames of the SDR content into the HDR pixel values based on the lookup table.

17. The method of claim 12, wherein the HDR pixel values correspond to a subset of the SDR pixel values of the image frames of the SDR content,
wherein the converting further comprises determining other HDR pixel values corresponding to other SDR pixel values from the HDR pixel values corresponding to the subset of the SDR pixel values based on the lookup table.

* * * * *